United States Patent [19]

Meisinger

[11] Patent Number: 5,193,421

[45] Date of Patent: Mar. 16, 1993

[54] SYSTEM AND METHOD FOR PRESETTING TOOLING

[75] Inventor: Ronald A. Meisinger, Westlake, Ohio

[73] Assignee: Atwood Industries, Inc., Westlake, Ohio

[21] Appl. No.: 899,454

[22] Filed: Jun. 16, 1992

[51] Int. Cl.$^5$ .............................................. B23B 1/00
[52] U.S. Cl. .................................. 82/1.11; 364/474.17; 364/474.21; 483/1; 483/9; 82/118; 82/129
[58] Field of Search ................ 82/1.11, 118, 129, 152, 82/158; 364/474.17, 474.21; 483/1, 9

[56] References Cited

U.S. PATENT DOCUMENTS

| | | | |
|---|---|---|---|
| 3,760,489 | 9/1973 | Griffith | 483/9 |
| 3,774,484 | 11/1973 | Douglas | 82/36 R |
| 3,811,179 | 5/1974 | Anderson | 483/46 |
| 3,901,158 | 8/1975 | Slavinski et al. | 82/158 |
| 4,083,644 | 4/1978 | Friedline | 407/67 |
| 4,084,462 | 4/1978 | Grindge | 82/158 |
| 4,296,364 | 10/1981 | Fukuyama et al. | 318/572 |
| 4,549,270 | 10/1985 | Fukumura et al. | 364/474.21 |
| 4,583,434 | 4/1986 | Moody et al. | 82/36 |
| 4,608,645 | 8/1986 | Niwa et al. | 364/474.17 |
| 4,631,994 | 12/1986 | Jester et al. | 82/36 R |
| 4,854,764 | 8/1989 | Faber et al. | 403/13 |
| 4,890,523 | 1/1990 | Satran | 82/158 |
| 4,954,004 | 9/1990 | Faber et al. | 403/13 |
| 5,127,140 | 7/1992 | Oiwa et al. | 29/27 C |

Primary Examiner—William E. Terrell
Attorney, Agent, or Firm—Calfee, Halter & Griswold

[57] ABSTRACT

A machine tooling system is provided, comprising a tooling machine having a plurality of adjustable cutting units installed at various locations therein, a collet for holding a workpiece to be tooled, and a presetter machine for adjusting the adjustable cutting units to within prescribed specifications when the adjustable cutting units are detached from the tooling machine. Each of the adjustable cutting units may be precisely positioned to contact the workpiece to be tooled, and each is provided with an identification device attached thereto. The identification devices provide (i) location information identifying a particular location on the tooling machining for which the cutting unit is precisely adjusted and (ii) adjustment information including the adjustment parameters at which the adjustable cutting unit is preset. A cutting unit identification subsystem reads and stores the location information and the adjustment information provided by the identification devices.

16 Claims, 4 Drawing Sheets

SYSTEM AND METHOD FOR PRESETTING TOOLING

FIELD OF THE INVENTION

The present invention relates generally to machinery for tooling parts and specifically to a system and method for presetting adjustments on adjustable cutting units of a tooling machine while the adjustable cutting units are detached from the tooling machine.

BACKGROUND OF THE INVENTION

In the field of machine tooling, blank workpieces are tooled into various objects having particular specifications by rotating the workpiece against a forming tool. Typically, the blank workpiece is held in place by a sleeve or collet which is rotated at high speeds. One or more forming tools are brought into contact with the rotating workpiece to form the tooled object. If more than one forming tool is utilized, they may simultaneously contact the workpiece being tooled or may sequentially contact the workpiece using, for example, a multi-spindle chucking machine. The multi-spindle machine is indexed through a multi-stage process during which different portions of the object are tooled at each stage in the sequence.

Each of the plurality of forming tools in a multi-spindle tooling machine must be precisely adjusted to provide for tooled objects which have dimensions that fall within acceptable tolerances. Typically, each of the forming tools is manually adjusted and the dimensions of the resulting tooled object are measured. This manual adjustment of the forming tool continues until the resulting tooled object falls within the prescribed specifications. The objects which are tooled to dimensions outside of the acceptable tolerances during this manual adjustment period are scrapped.

Because of slight variances in the dimensions of corresponding locations of forming tools on different tooling machines, and even between corresponding locations on different spindles of the same tooling machine, the positions of the manually adjusted forming tools may not be interchanged throughout the system without compromising the accuracy of the tooling operation. A forming tool which is precisely adjusted for a particular location within the tooling operation may not be correctly adjusted for another location in the operation at which an identical forming operation takes place. The adjustments made to each forming tool are considered reliable only for that location at which they are made. Accordingly, every time that a new tooling operation is required, each of the forming tools must again be manually adjusted for the new operation, resulting in additional scrap material. Manual readjustment may even be required if the spindle tooling machine is shut down after operating for an extended period of time, due to thermal expansion and contraction of the tooling machine itself.

The forming tools in these types of tooling operations typically have a finite operational lifetime during which acceptable performance of the tool is insured. If the forming tool should continue to be used in forming operations after its operational lifetime has elapsed, the resulting tooled objects may not be within the required specifications, resulting in tooled objects which must be scrapped. Thereafter, the replacement tool requires initial manual adjustment before it can form objects within acceptable tolerances. This required manual adjustment results in further unacceptable material.

Multi-spindle tooling machines are typically provided with a plurality of indexing stations. Each of these indexing stations may include more than one forming tool. Accordingly, each multi-spindle tooling machine has associated with it a significant number of forming tools, each of which must be precisely adjusted to properly form the tooled object within acceptable tolerances. If a particular tooling operation includes several multi-spindle tooling machines, the task of manually adjusting each of the forming tools in the tooling operation during an initial operation, in response to a new tooling operation, and during forming tool replacement, may result in a significant amount of scrap material. Moreover, the time required for the manual adjustment of each of the forming tools in the tooling operation may significantly reduce the output of the operation.

Accordingly, present methods of adjusting forming tools in tooling operations utilizing multi-spindle tooling machines result in considerable amounts of scrapped material as well as excessive downtime. Thus, there is a need for improved methods of adjusting such forming tools so as to increase the efficiency of these types of operations and to reduce the amount of resultant scrap material produced by the operation. The present invention addresses this need.

SUMMARY

According to the present invention, a system for presetting tooling is provided which permits tools to be preadjusted while detached from the machines on which they are to be installed, thereby reducing downtime and increasing the overall efficiency of the system. The system includes a presetter machine for adjusting a plurality of adjustable cutting units which are used in at least one spindle chucking or tooling machine in the system, and an identification subsystem which is used to (i) store the adjustment parameters of each cutting unit used in the system and (ii) identify the location in the system for which each cutting unit is adjusted.

The presetter machine provides the means to measure and display the adjustment parameters at which the cutting unit installed therein is calibrated. Each of the cutting units associated with a particular location in the system is provided with an adjustable tooling cartridge. Forming tools on each of the tooling cartridges are adopted to contact a workpiece to be tooled which is rotated at high speed about a longitudinal axis. Precise positioning of the forming tools with respect to the workpiece is accomplished by a pair of set screws located on each of the cutting units. One set screw is used to adjust the position of the forming tool along a direction which is parallel with the longitudinal axis, and the other set screw is used to is to adjust the position of the forming tool in a radial direction which is perpendicular to the longitudinal axis.

The identification subsystem comprises an identification device attached to each of the cutting units, an optical non-contact read/write scanning unit for reading the information contained within the identification devices, and a computer and printer connected thereto for storing the information scanned by the scanning unit. The identification device is an optically scannable semiconductor memory chip which provides the means to identify a particular cutting unit with a corresponding location on the tooling machine for which it is precisely adjusted. The identification device also stores the adjustment parameters at which the cutting unit is set. This location and adjustment information is read and written between the computer and the various identification devices by the non-contact scanning unit.

To implement the presetting method of tooling of the present invention, a cutting unit must first be manually adjusted at each cutting assembly location in the operation. The cutting units are removed and installed in the presetter machine. The parameters which define the forming operation to be performed by the manually adjusted cutting unit are determined at the presetter machine. The two parameters measured at the presetter machine are the distance between the end of the cutting unit to the tip of the forming tool and the distance between the longitudinal axis of rotation and the tip of the forming tool. These two parameters are entered into the computer and also into the identification device for that cutting unit. Once these parameters have been determined by the presetter machine and recorded by the identification subsystem, for all of the cutting locations in the system, cutting units may be preset for any type of forming operation at any location in the system at the presetter machine. Further manual adjustment while on the spindle tooling machine is not required.

DETAILED DESCRIPTION OF THE PREFERRED EMBODIMENT

Figure 1:
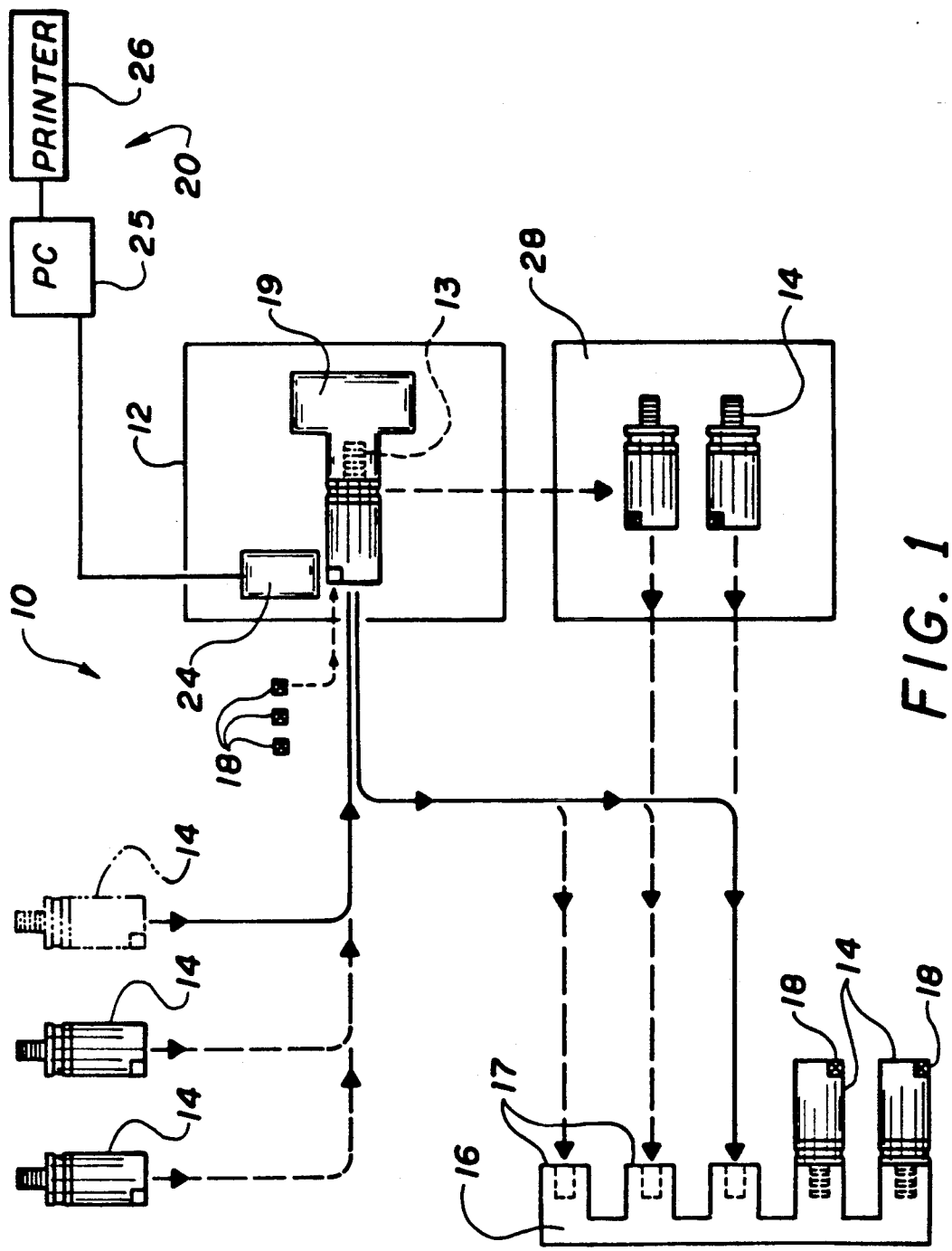
FIG. 1 is a schematic diagram of the system for presetting tooling constructed according to the principles of the present invention.

Referring now to the drawings, a system for presetting tooling constructed according to the principles of the present invention is shown. The system permits tools to be preadjusted while detached from the machines on which they are installed, thereby reducing downtime and increasing the overall efficiency of the system.

As shown in FIG. 1, a schematic diagram of a system 10 for presetting tooling includes a presetter machine 12 for adjusting a plurality of adjustable cutting units 14 which are used in at least one spindle chucking or tooling machine 16 in the system. Each spindle tooling machine 16 is provided with a plurality of stations 17 which may be indexed during a tooling operation with respect to an object to be tooled. The spindle tooling machine 16 shown in FIG. 1 has five such stations, each of which is provided with at least one adjustable cutting unit 14. A sixth station (not shown) is used for loading and unloading the tooled objects from the spindle tooling machine 16.

Each of the adjustable cutting units 14 is provided with an adjustable tooling cartridge 18. The adjustable cutting units 14 and the adjustable tooling cartridges 18 are commercially available tooling components, such as those provided by Sandvik Coromant Corporation, Special Tooling Services, Parma Heights, Ohio. The tooling cartridges are adjusted at the presetter machine 12 while they are detached from the spindle tooling machine 16. The presetter machine 12 is provided with a threaded mount 13 into which an adjustable cutting unit 14 is screwed to fix its position during its adjustment. The presetter machine 12 provides the means to measure and display the adjustment parameters to which the cutting unit 14 installed therein is calibrated. In the preferred embodiment, the presetter, model number PSH3050, is manufactured by TSD Microbore (Devlieg) of Frankenmuth, Mich., U.S.A.

The presetter machine 12 operates in conjunction with an identification subsystem 20 which is used to (i) store the adjustment parameters of each cutting unit 14 used in the system and (ii) identify the location in the system for which each cutting unit is adjusted. The adjustment information and location information for a particular cutting unit 14 is stored on that cutting unit by means of an identification device 22 (see FIG. 2). The identification subsystem 20 further comprises an optical non-contact read/write scanning unit 24 for reading the information contained within the identification devices 22, and a computer 25 and printer 26 connected thereto for storing the information scanned by the scanning unit 24. The system 10 may also include a storage rack 28 for storing preadjusted cutting units 14 which are ready to be installed into a particular tooling machine location within the system 10.

Figure 2:
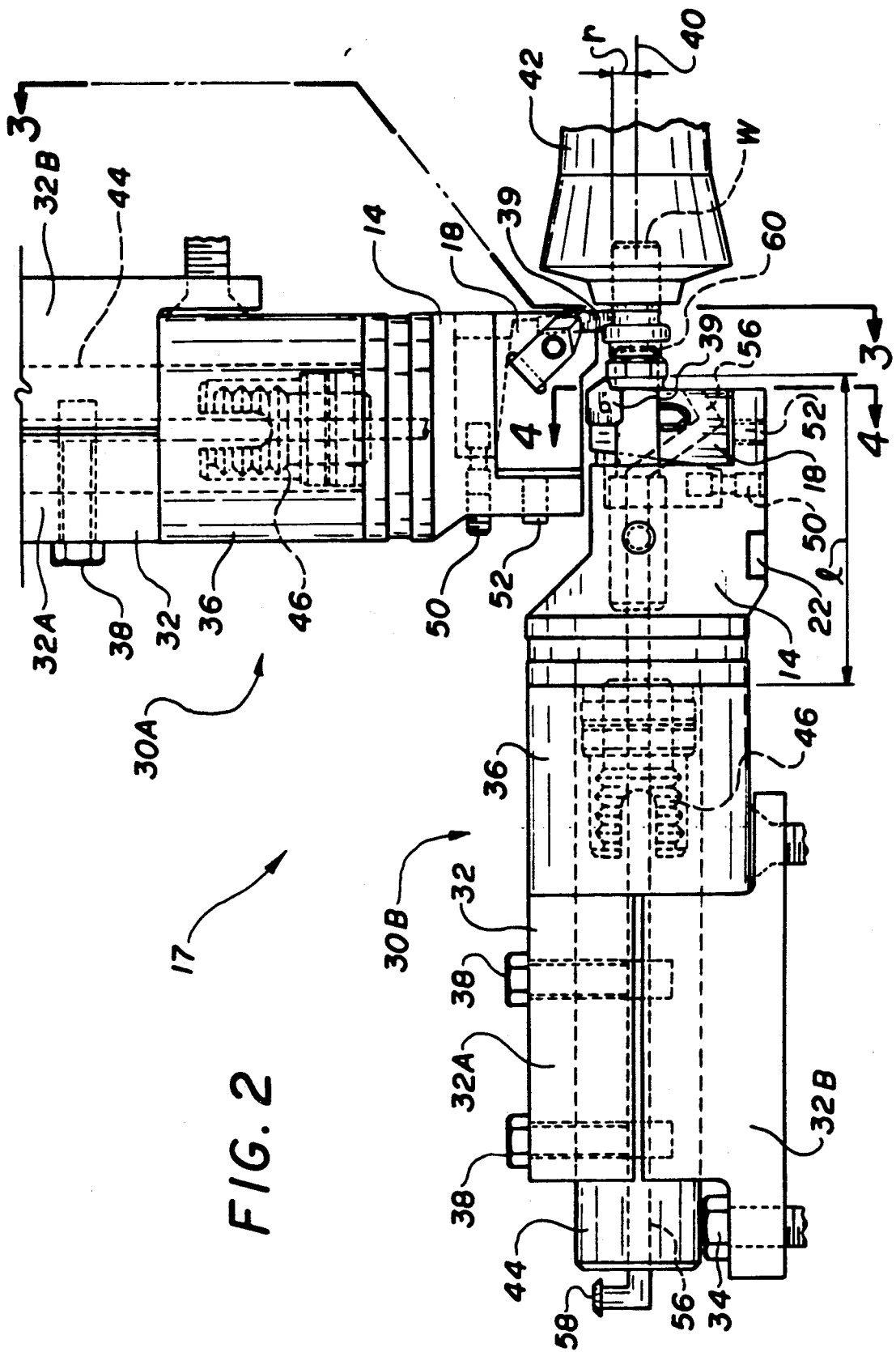
FIG. 2 is a top plan view of the cutting assemblies forming one of the stations of the spindle tooling machine of the system shown in FIG. 1.

FIG. 2 shows one station 17 of the multi-station spindle tooling machine 16. The particular station 17 shown provides two cutting assemblies 30A, 30B each adapted for a specific cutting operation, and each provided with a cutting unit 14. The number of spindle tooling machines 16, the number of stations 17 on each spindle tooling machine, and the number of cutting assemblies 30 per station is not critical to the present invention, however, and so the two cutting assemblies shown in FIG. 2 are made by example only.

Each of the cutting assemblies 30A, 30B comprises a tool holder 32 mounted to the spindle tooling machine 16 by means of bolts 34, a threaded receiver 36 slidably mounted to the tool holder 32 by means of bolts 38, and an adjustable cutting unit 14 provided with a tooling cartridge 18. Forming tools 39 on each of the tooling cartridges 18 are shown contacting a workpiece to be tooled. The workpiece W is rod-like in shape and is formed symmetrically about a longitudinal central axis 40. Typical workpieces include blanks for screws, spark plugs, etc. The workpiece W is held in place by a collet 42 which revolves about the longitudinal central axis 40 at high speeds so that the fixed position forming tools 39 on the tooling cartridges 18 form the workpiece W when placed in contact therewith.

The threaded receivers 36 of the cutting assemblies are slidably mounted to the tool holders 32 at each station 17 by means of a smooth shaft 44 extending from the rear of the threaded receivers. As used herein, "rear" shall define a direction toward the tool holder 32 and "front" shall define a direction toward the workpiece W. Each of the tool holders 32 comprises an upper tool holder half 32A and a lower tool holder half 32B, secured together by the bolts 38. The upper and lower tool holder halves form a cylindrical opening through which the shaft 44 extends. By loosening the bolts 38, the shaft 44, and hence the threaded receiver 36 from which it extends, is slidable with respect to the tool holder 32 which is fixedly secured to the spindle tooling machine 16. As shown in FIG. 2, the threaded receiver 36 of cutting assembly 30B is slidable with respect to the spindle tooling machine in a direction along the longitudinal central axis 40. The threaded receiver of cutting assembly 30A is slidable with respect to the spindle tooling machine in a direction which is perpendicular to the longitudinal central axis 40. Generally, if more than two cutting assemblies are provided per station 17, the additional cutting assemblies are positioned radially about the longitudinal central axis 40 and are slidable with respect to the spindle tooling machine in a direction perpendicular to the axis 40. Accordingly, the tooling cartridges 18 on the cutting assemblies 30 may be roughly positioned with respect to the workpiece W to be tooled. Other coarse adjustments (not shown) for positioning the tooling cartridges 18 are provided on the spindle tooling machine 16.

The cutting units 14 are secured in fixed position to the threaded receivers 36 by means of threaded extensions 46 extending from the rear of the cutting units. Each of the tooling cartridges 18 is secured to its associated cutting unit 14 by means of a screw 48 (see FIG. 3). The fine positioning of the forming tools 39 with respect to the workpiece W is accomplished by a pair of set screws 50, 52 located on each of the cutting units 14. As shown in FIG. 2, set screw 50 on the cutting unit of cutting assembly 30B is used to adjust the position of the forming tool 39 along a direction which is parallel with the longitudinal central axis 40, thereby moving the forming tool toward and away from the workpiece along longitudinal central axis 40. Set screw 52 on the cutting unit of cutting assembly 30B is used to is to adjust the position of the forming tool 39 in a direction which is perpendicular to and radially outward from the longitudinal central axis 40, to thereby move the forming tool toward and away from the axis 40. Similarly, set screw 50 on the cutting unit of cutting assembly 30A is used to is to adjust the position of the forming tool 39 along a direction which is perpendicular to and radially outward from the longitudinal central axis 40, and set screw 52 on the cutting unit of cutting assembly 30A is used to is to adjust the position of the forming tool 39 in a direction which is parallel with the longitudinal central axis 40.

Because the collet 42 rotates at a high rate of speed during forming operations, the grinding action of the forming tools 39 on the workpiece W generates a significant amount of heat on and near the surface of the workpiece. Accordingly, a channel 56 is provided through the center of the cutting assembly 30 through which coolant may flow to reduce the temperature of the workpiece as it is being formed. A fitting 58 is provided at the end of shaft 44 which may be connected to a suitable coolant supply.

The forming tool 39 on the cutting assembly 30B, in the example shown in FIG. 2, is used to form a beveled end of the workpiece W. Because formation of such a beveled end exerts pressure on the workpiece in a radial direction toward the longitudinal central axis 40, a support 60 extends from the cutting unit 14 to support the workpiece from the inside. With the support so disposed, the position of the workpiece W may be fixed along the longitudinal central axis 40 as it is rotated in the presence of such a radial force.

FIG. 2 also shows the location of the identification device 22 on the exterior of the adjustable cutting unit 14. The identification device in the preferred embodiment is an optically scannable semiconductor memory chip model number C1S-RWDC-120-0 available from Balluff Inc. of Florence, Ky., U.S.A. The identification device 22 provides the means to identify a particular cutting unit 14 with a corresponding location on the spindle tooling machine for which it is precisely adjusted. The identification device also stores the adjustment parameters to which the cutting unit 14 is set. The manner in which this location information and adjustment information is entered into and read from the identification device will be described in further detail below.

Figure 3:
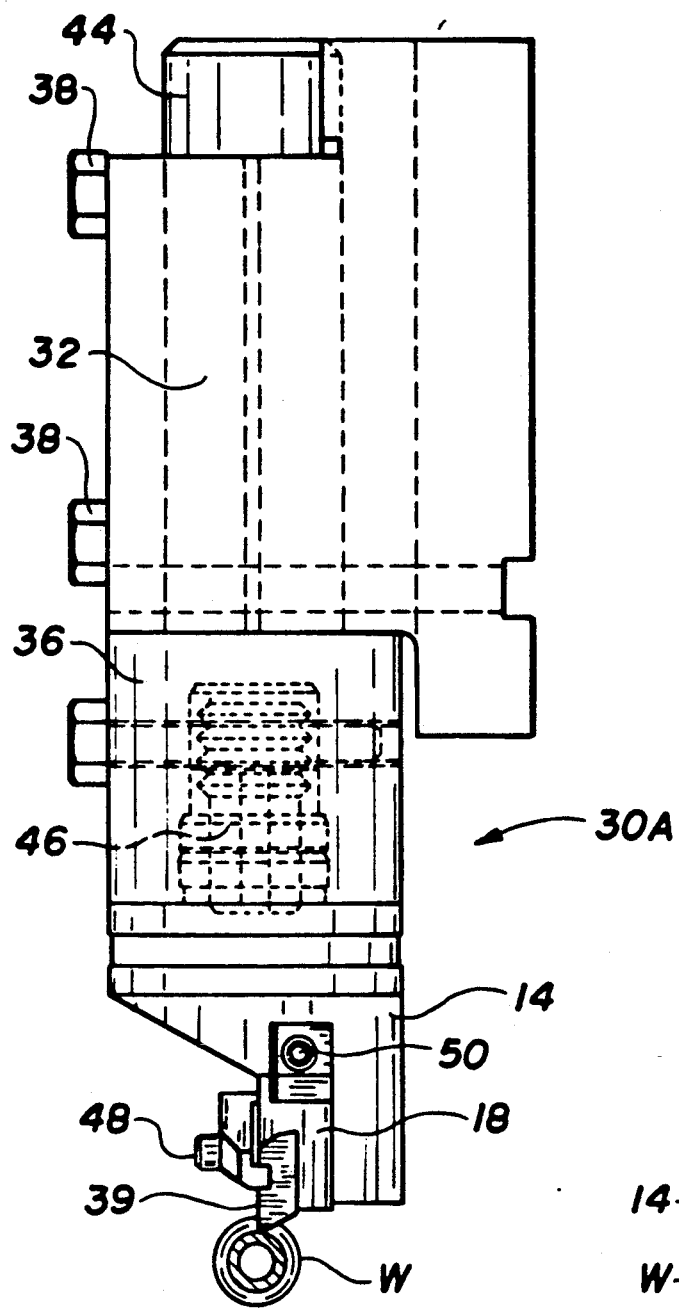
FIG. 3 is a side view of one of the cutting assemblies of FIG. 2, taken along the line 3—3.
Figure 4:
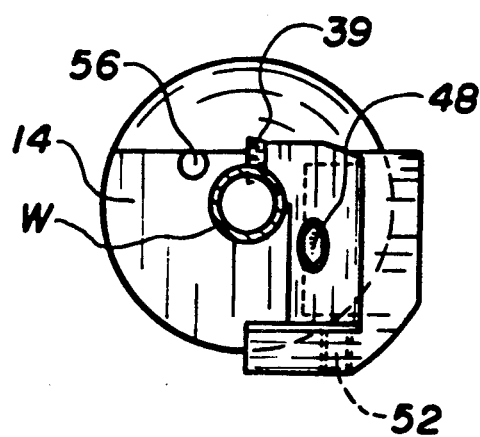
FIG. 4 is an end view of one of the cutting assemblies of FIG. 2, taken along the line 4—4.

FIGS. 3 and 4 further illustrate the cutting assembly 30A of FIG. 2. Because the position of the tool holder 32 is fixed with respect to the spindle tooling machine 16 by bolts 34 (FIG. 2), and the position of the threaded receiver 36 is fixed with respect to the tool holder 32 by the bolts 38, the distance r, which measures the distance from the tip of the forming tool 39 to the longitudinal axis 40, determines the radial depth to which the workpiece W will be formed. The distance r is adjusted by set screw 50. The distance I at which the tip of the forming tool is set along the longitudinal central axis 40, and hence along the length of the workpiece W, is adjusted by set screw 52. The above description pertains only to cutting assembly 30A of FIG. 2. For the cutting assembly 30B, the adjustment to set screw 50 determines the position of the forming tool along the longitudinal central axis 40, and the adjustment to set screw 52 determines the radial depth at which the forming tool 39 will be positioned.

Figure 5:
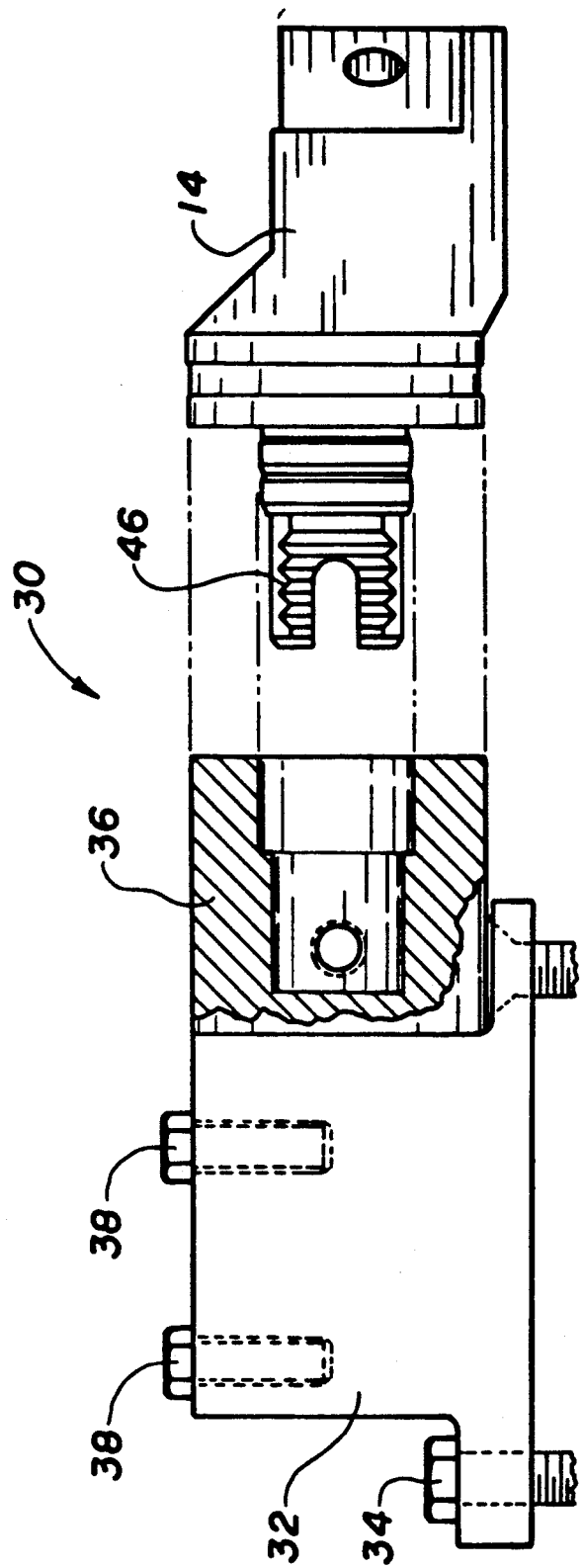
FIG. 5 is a side view of one of the cutting assemblies of FIG. 2 showing the detachability of the assembly cutting unit.

In either case, the only variables which may be changed to alter the dimensions of a particular tooling process are confined to the adjustable cutting unit 14. Accordingly, the entire cutting unit 14, having an adjustable tooling cartridge 18 connected thereto, is removed from the threaded receiver 36 and installed in the threaded mount 19 of the presetter machine 12 to determine the parameters which define the forming operation to be performed by the cutting unit 14. FIG. 5 shows the manner in which the a cutting unit 14 is removably installed into a cutting assembly 30. For the sake of simplicity, the cutting unit 14 is shown without its associated tooling cartridge 18.

In order to implement the presetting method of tooling provided by the present invention, a cutting unit 14 must be manually adjusted at each cutting assembly location in the operation. The parameters which define the forming operation to be performed by the manually adjusted cutting unit are determined at the presetter machine. Once these parameters have been determined by the presetter machine 12 and recorded by the identification subsystem 20, the cutting units 14 may be preset for any type of forming operation at any location in the system at the presetter machine 12. Manual adjustment while on the spindle tooling machine 16 is no longer required.

Initially, for each cutting assembly location in the system a cutting unit 14 having a tooling cartridge 18 attached thereto is installed in a threaded receiver 36. The set screws 50 and 52 on the tooling cartridge 18 are set at their midpoints. The position of the tool holder 32 is adjusted with respect to the spindle tooling machine 16 using bolts 34, and the position of the threaded receiver 36 is adjusted with respect to the tool holder 32 using bolts 38, until a workpiece W is tooled to within specifications. The bolts 34 and 38 are then permanently tightened in this position.

The cutting units 14 are then removed and installed into the threaded mount 19 of the presetter machine 12.

The two parameters measured at the presetter machine 12 are those establishing the distances (i) between the tip of the forming tool 39 and the rear surface of the cutting unit 14 from which threaded extension 46 extends and (ii) between the centerline of the threaded extension 46 and the tip of the forming tool 39. These numbers are measured at the presetter machine 12 and are compared with established nominal values for the two parameters for a particular cutting location within the system. The variances between the nominal values and the measured parameters, as well as the particular position in the system from which the cutting unit was removed, are entered into the computer 25. A standard personal computer will be sufficient to perform the required duties, and in the preferred embodiment, an IBM model 7532 with graphics capabilities is employed. The scanning unit 24 writes this adjustment information and location information into the identification device 22 on cutting unit 14 while it remains in the presetter machine 12. The scanning unit in the preferred embodiment is a non-contact optical read/write head, model C1S-RWPA-110-0, manufactured by Balluff Inc. of Florence, Ky., U.S.A. Of course, other types of devices may be used to construct the identification subsystem memory. All that is required is a common memory device and the ability to read and write information to that memory device.

Once this initial setup is complete, cutting units 14 for any cutting location in the system may be preset at the presetter machine 12 using set screws 50 and 52, because the correct forming operation parameters are known for each location within the system. For example, if the forming specifications of a particular operation are known, any cutting unit 14 taken from a stock supply may be adjusted for a particular system location at the presetter machine 12. The location is entered into the computer 25, and the variances from the nominal adjustment values are used to precisely adjust the cutting unit for that location. The resulting location information and adjustment information is then written to the identification device 22 for that cutting unit.

Similarly, replacement cutting units 14 may be adjusted in advance of their time of replacement. An identical set of cutting units could be reconstructed with the information contained within the computer. These replacement cutting units 14 need not be inventoried in an intricate storage system because all of the required location and adjustment information is contained within the identification devices 22 attached to the cutting units, and can be read by simply scanning the identification devices 22 with the scanning unit 24.

Thus, the system 10 reduces the waste material associated with repeated manual adjustments of cutting units during operation of the system. Waste may be further reduced by anticipating the time at which a forming tool 39 will reach the end of its operational lifetime. Such information may be recorded in the computer 25 so that a replacement cutting unit 14 may be preset in advance of the recommended time of replacement. This operational lifetime information may also be written into the identification device 22 on the particular cutting unit 14 to which the forming tool 39 is attached.

Accordingly, the preferred embodiment of a system and method for presetting tooling according to the present invention has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What I claim is:

1. A machine tooling system, comprising:
   a tooling machine having a plurality of adjustable cutting units installed therein at various locations on the tooling machine, each of said adjustable cutting units being positionable to contact a workpiece to be tooled and having an identification device attached thereto, each of said identification devices providing location information relating the adjustable cutting unit to which it is attached to a particular location on said tooling machine;
   a collet for holding a workpiece to be tooled,
   a presetter machine for adjusting said adjustable cutting units to within prescribed specifications when said adjustable cutting units are detached from said tooling machine; and
   a cutting unit identification subsystem for storing said location information provided by said identification devices.

2. The device of claim 1, wherein said identification device is a semiconductor memory device and said cutting unit identification subsystem reads said location information contained within said memory device.

3. The device of claim 2, wherein said semiconductor memory device is optically scannable and said cutting unit identification subsystem includes (i) a non-contact optical scanner for reading the location information contained within said optically scannable memory device and (ii) subsystem memory for storing said location information.

4. The device of claim 2, wherein said semiconductor memory device also stores information relating to the operational life of the adjustable cutting unit to which it is attached.

5. The device of claim 2, wherein said identification device contains adjustment information relating to the adjustment settings of the adjustable cutting unit to which it is attached.

6. The device of claim 5, wherein each of said adjustable cutting units includes a removable tooling cartridge having an adjustment mechanism.

7. The device of claim 5, wherein said adjustable cutting unit is provided with at least one set screw.

8. The device of claim 5, wherein the workpiece to be tooled is a metal rod-like blank.

9. The device of claim 8, wherein the workpiece to be tooled is used to form a shell of a spark plug.

10. A method of presetting adjustable blade cartridges in a tooling machine having a plurality of adjustable blade cartridges installed therein at various locations on the tooling machine, the method comprising the steps of:
    attaching an identification device to one of said plurality of adjustable cutting units;
    installing said adjustable cutting unit in one of said various locations the tooling machine;
    manually adjusting said adjustable cutting unit so that a workpiece tooled by said blade cartridge is within prescribed specifications;
    removing said adjustable cutting unit from said tooling machine and installing said adjustable cutting unit in a presetting machine; and
    registering in said identification device location information relating to the particular location on said tooling machine from which said adjustable cutting unit was removed.

11. The method of claim 10, further comprising the steps of:
registering in said identification device adjustment information relating to adjustment settings of the adjustable cutting unit to which it is attached;
reading from said identification device and storing in a memory device said location information and said adjustment information;
removing said adjustable cutting unit from said presetter machine and installing a second adjustable cutting unit into said presetter machine;
recalling said location information and said adjustment information from said memory device;
adjusting said second adjustable cutting unit on said presetter machine corresponding to said adjustment information; and
installing said second adjustable cutting unit on said tooling machine corresponding to said location information.

12. The method of claim 11, wherein said identification device is an optically scannable semiconductor device and a non-contact optical scanner is used for reading said location information and said adjustment information from said optically scannable memory device.

13. The method of claim 11, wherein said identification device also stores information relating to the operational life of the adjustable cutting unit to which it is attached.

14. The method of claim 11, wherein each of said adjustable cutting units includes a removable tooling cartridge having an adjustment mechanism.

15. The method of claim 14, wherein the workpiece to be tooled is a metal rod-like blank.

16. The method of claim 15, wherein the workpiece to be tooled is used to form a shell for a spark plug.

* * * * *